US010031803B2

(12) United States Patent
Blaum et al.

(10) Patent No.: US 10,031,803 B2
(45) Date of Patent: Jul. 24, 2018

(54) DISTRIBUTED CODING FOR MULTIPLE DIMENSIONAL PARITIES

(71) Applicant: International Business Machines Corporation, Armonk, NY (US)

(72) Inventors: Mario Blaum, San Jose, CA (US); Aayush Gupta, San Jose, CA (US); James L. Hafner, Pacific Grove, CA (US); Steven R. Hetzler, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/968,713

(22) Filed: Dec. 14, 2015

(65) Prior Publication Data

US 2017/0168897 A1    Jun. 15, 2017

(51) Int. Cl.
*G06F 11/10*    (2006.01)
*G06F 3/06*    (2006.01)

(52) U.S. Cl.
CPC .......... *G06F 11/1076* (2013.01); *G06F 3/064* (2013.01); *G06F 3/067* (2013.01); *G06F 3/0619* (2013.01)

(58) Field of Classification Search
CPC .... G06F 11/1076; G06F 3/0619; G06F 3/064; G06F 3/067
See application file for complete search history.

(56) References Cited

U.S. PATENT DOCUMENTS

| 4,814,980 | A  | * | 3/1989  | Peterson ........... G06F 15/17368 709/216 |
| 6,748,488 | B2 |   | 6/2004  | Byrd |
| 7,788,569 | B2 |   | 8/2010  | Hetzler et al. |
| 8,145,941 | B2 |   | 3/2012  | Jacobson |
| 8,171,379 | B2 |   | 5/2012  | Adarshappanavar et al. |
| 8,595,606 | B1 |   | 11/2013 | Feng et al. |
| 8,793,556 | B1 |   | 7/2014  | Northcott |
| 8,914,706 | B2 |   | 12/2014 | Anderson |
| 8,918,701 | B2 |   | 12/2014 | Blaum |
| 9,356,626 | B2 |   | 5/2016  | Alexeev |
| 9,449,357 | B1 | * | 9/2016  | Lyons ................... G06T 1/0021 |
| 2008/0222480 | A1 |  | 9/2008 | Huang et al. |
| 2008/0222481 | A1 |  | 9/2008 | Huang et al. |
| 2010/0316158 | A1 | * | 12/2010 | Arne ................... A61B 5/0031 375/285 |

(Continued)

FOREIGN PATENT DOCUMENTS

EP    1327936 A2    7/2003

OTHER PUBLICATIONS

List of IBM Patents or Applications Treated as Related.
(Continued)

*Primary Examiner* — Kyle Vallecillo
(74) *Attorney, Agent, or Firm* — Sherman IP LLP; Kenneth L. Sherman; Steven Laut

(57) ABSTRACT

A method for distributed coding in a storage array is presented. The method includes dividing data into multiple stripes for storage in a storage array including storage devices with a topology of a hypercube of a dimension $t \geq 3$. The storage devices in same hypercubes of dimension $t-1$ including the hypercube of a dimension t have even parity. Global parities are added to the hypercube such that a minimum distance of a code is enhanced.

20 Claims, 12 Drawing Sheets

(56) References Cited

U.S. PATENT DOCUMENTS

| | | |
|---|---|---|
| 2011/0219208 A1 | 9/2011 | Asaad et al. |
| 2012/0221926 A1 | 8/2012 | Blaum et al. |
| 2014/0040702 A1 | 2/2014 | He et al. |
| 2014/0089759 A1 | 3/2014 | Draper et al. |
| 2014/0310571 A1 | 10/2014 | Fetterly et al. |
| 2014/0334575 A1 | 11/2014 | Arne et al. |

OTHER PUBLICATIONS

Ernvall, T. et al., "Constructions of Optimal and Almost Optimal Locally Repairable Codes", Proceedings of the 4th International Conference on Wireless Communications, Vehicular Technology, Information Theory and Aerospace & Electronic Systems (VITAE), May 11-14, 2014, pp. 1-5, IEEE, United States.

Rawat, A.S. et al., "On Codes with Availability for Distributed Storage", Proceedings of the 6th International Symposium on Communications, Control and Signal Processing (ISCCSP '14), May 21-23, 2014, pp. 15-18, IEEE, United States.

Cassuto, Y. et al., "LDPC Codes for Two-Dimensional Arrays", Proceedings of IEEE Transactions on Information Theory, Mar. 25, 2014, pp. 1-13, IEEE Information Theory Society, United States.

Goparaju, S. et al., "Binary Cyclic Codes that are Locally Repairable", Proceedings of the 2014 IEEE International Symposium on Information Theory (ISIT), Jun. 29, 2014-Jul. 4, 2014, pp. 676-680, IEEE, United States.

TN-29-17: NAND Flash Design and Use Considerations Introduction, Micron Technology, Inc., 2006, 8 pages.

Blaum, M. et al., "Construction of Partial MDS {PMOS) and Sector-Disk {SO) Codes with Two Global Parity Symbols," arXiv preprint arXiv:1401.4715, Jan. 2014, 5 pages.

Blaum, M. et al., "Construction of two SO Codes," arXiv preprint arXiv:1305.1221, May 2013, 8 pages.

Blaum, M. et al., "Generalized Concatenated Types of Codes for Erasure Correction," arXiv preprint arXiv:1406.6270, Jul. 2014, 28 pages.

Blaum, M. et al., "Partiai-MDS Codes and their Application to RAID Type of Architectures," arXiv preprint arXiv:1205.0997, Sep. 2014, 35 pages.

Blaum, M., "Construction of PMOS and SO codes extending RAID 5," arXiv preprint arXiv:1305.0032, Apr. 2013, 7 pages.

3ibson, G. A., "Redundant Disk Arrays; Reliable, Parallel Secondary Storage," The MIT Press, ISBN 0262071428, 1992.

3opalan, P. et al., "Explicit Maximally Recoverable Codes with Locality," arXiv preprint arXiv:1307.4150, Jul. 2013, 14 pages.

Huang, C. et al., "Erasure Coding in Windows Azure Storage," 2012 Usenix Annual Technical Conference, Boston, MA, Jun. 2012, 15 pages.

Kamath, G. M. et al., "Explicit MBR All-Symbol Locality Codes," arXiv preprint arXiv:1302.0744, May 2013, 8 pages.

Li, M. et al., "STAIR Codes: A General Family of Erasure Codes for Tolerating Device and Sector Failures in Practical 11 Storage Systems," Proceedings of the 12th US EN IX Conference on File and Storage Technologies, Feb. 2014, 1 pages.

MacWilliams, F. J. et al., "The Theory of Error-Correcting Codes," Elsevier, North Holland, Amsterdam, 1977.

Papailiopoulos, D. S. et al., "Locally Repairable Codes," arXiv preprint arXiv:1206.3804, May 2014, 19 pages.

Plank, J. S. et al., "SO Codes: Erasure Codes Designed for How Storage Systems Really Fail," Proceedings of the 11th US EN IX Conference on File and Storage Technologies, Feb. 2013, 33 pages.

Plank, J. S. et al., "Sector-Disk (SO) Erasure Codes for Mixed Failure Modes in RAID Systems," ACM Transactions on Storage, vol. 10, No. 1, Article 4, Jan. 2014, pp. 4:1-4:17.

Rawat, A. S. et al., "Optimal Locally Repairable and Secure Codes for Distributed Storage Systems," arXiv preprint arXiv:1210.6954, Oct. 2012, 18 pages.

Sathiamoorthy, M. et al., "XORing Elephants: Novel Erasure Codes for Big Data," arXiv preprint arXiv:1301.3791, Jan. 2013, 16 pages.

Tamo, I. et al., "A family of optimal locally recoverable codes," arXiv preprint arXiv:1311.3284, Jul. 2014, 16 pages.

List of IBM Patents Applications Treated as Related.

List of IBM Patents or Applications Treated as Related U.S. Appl. No. 15/982,964, filed May 17, 2018.

\* cited by examiner

DISTRIBUTED CODING FOR MULTIPLE DIMENSIONAL PARITIES

BACKGROUND

Embodiments of the invention relate to storage systems, in particular, for parities in multiple dimensions for data recovery.

Considerable interest has arisen lately in coding schemes that combine local and global properties. Applications like Redundant Arrays of Independent Disks (RAID) architectures are an example of this interest. In effect, given an array of storage devices, a regular RAID architecture such as RAID 5, protects against a total storage device failure. The storage devices may be, for example, solid state devices (SSDs), hard disk drives (HDDs), tapes, or other types of storage devices. The RAID 5 architecture is implemented by XORing the contents of the data storage devices, where the outcome of XORing is stored in a parity storage device. Then, if a storage device fails, its contents can be recovered by XORing the contents of the surviving storage devices. However, RAID 5 may be insufficient for large numbers of storage devices. More failures may occur exceeding the erasure-correcting capability of the code. A possible solution is using RAID 6, which adds a second parity, but such an approach may be wasteful.

Other approaches involve using a limited amount of parities, such as one or two extra parities, called global parities. So, if there is an m×n array of storage devices, each row is protected by a parity like in RAID 5. A column of storage devices may represent a box or some other configuration, but it is assumed that a column may fail, in which case each element in the column is recovered row by row (locally), like in RAID 5. But if some extra storage devices have failed in addition to the column, data loss will occur if no extra precautions are taken.

SUMMARY

Embodiments of the invention relate to storage device arrays including parities in multiple dimensions for data recovery. In one embodiment, a method includes dividing data into multiple stripes for storage in a storage array including storage devices with a topology of a hypercube of dimension t≥3. The storage devices in same hypercubes of dimension t−1 have even parity. Global parities are added to the hypercube such that a minimum distance of a code is enhanced.

These and other features, aspects and advantages of the present invention will become understood with reference to the following description, appended claims and accompanying figures.

DETAILED DESCRIPTION

Figure 1:
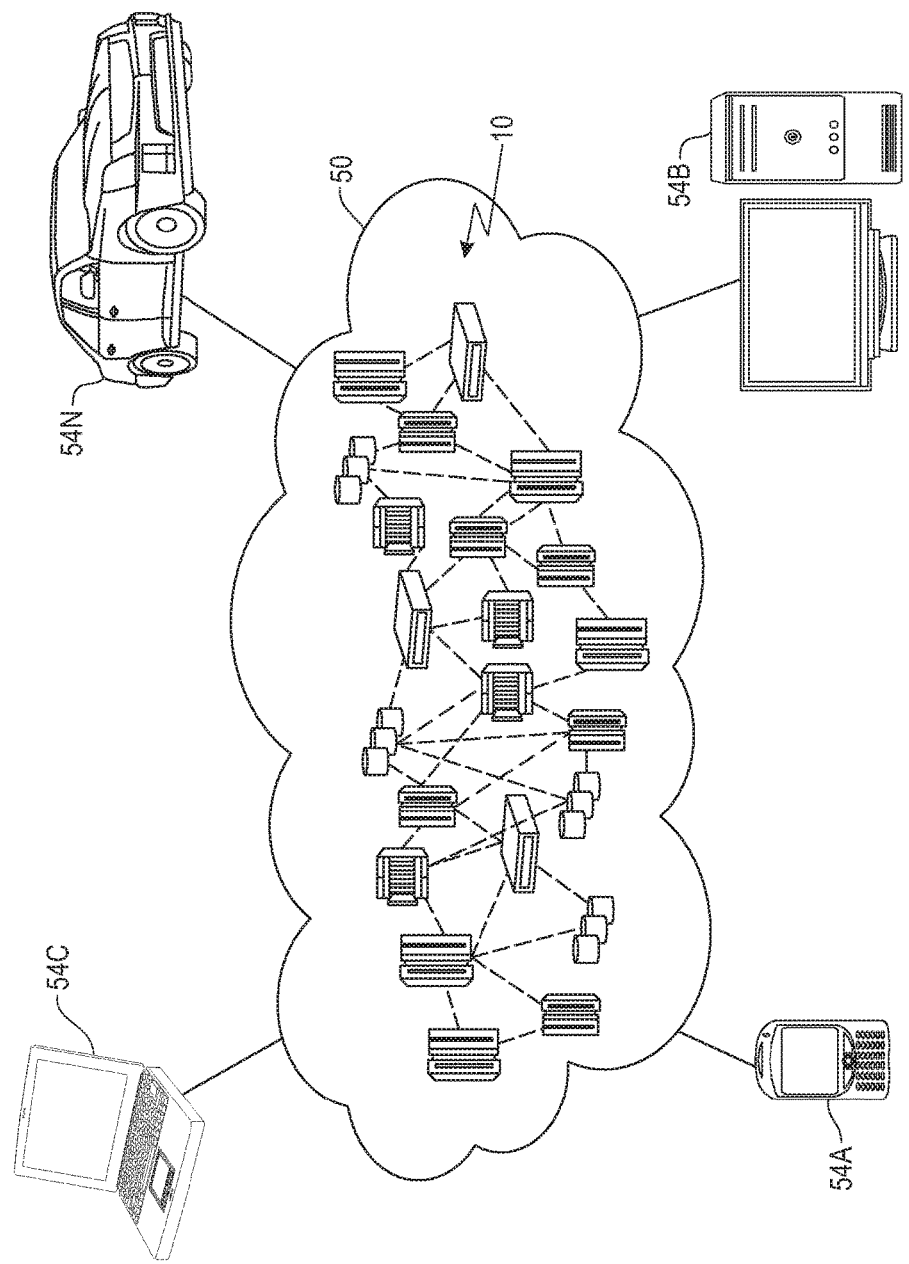
FIG. 1 depicts a cloud computing environment, according to an embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
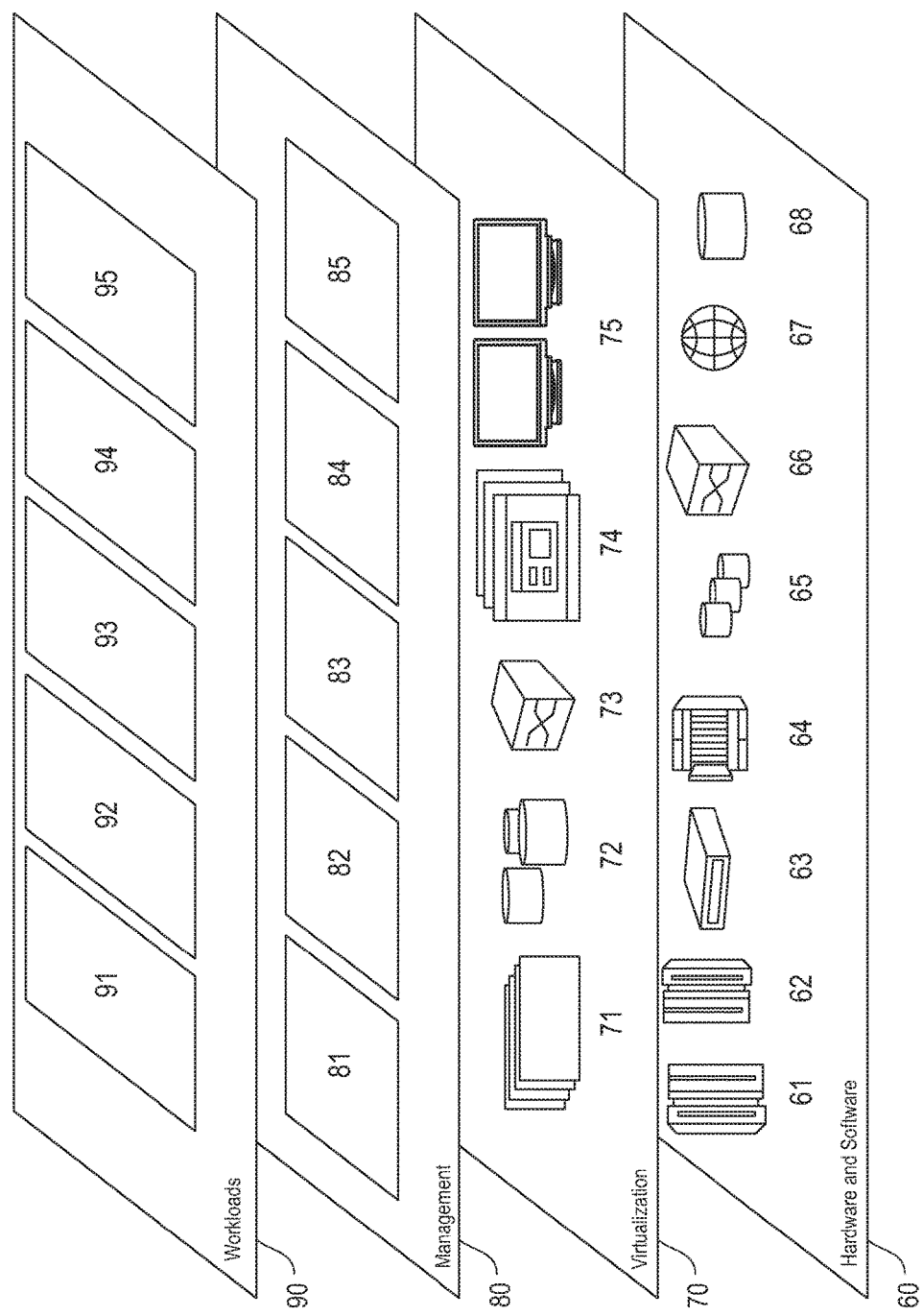
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. As mentioned above, all of the foregoing examples described with respect to FIG. 2 are illustrative only, and the invention is not limited to these examples.

It is understood all functions of one or more embodiments as described herein may be typically performed by the system 100 (FIG. 3), system 200 (FIG. 4), or the computing system 1200 (FIG. 12), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Flash devices are a type of non-volatile storage devices that can be electrically erased and reprogrammed in large blocks. Like hard disk drives (HDDs), flash devices divide the medium into sectors that are typically 512 bytes long. Flash devices further collect sectors into pages with typically eight sectors per page, so that each page contains four thousand or 4 kilo (K) bytes. Each sector is protected by an error correcting code (ECC) that corrects a number of single bit errors. A popular choice, for example, is a Bose-Chaudhuri-Hocquenghem (BCH) code, like an eight bit correcting or fifteen bit correcting BCH code, although many variations are possible. BCH codes do hard decision decoding. Low Density Parity Check (LDPC) codes are another example of a popular choice, and in this case soft decision is used. As in HDDs, pages in flash devices may suffer hard errors (HEs). This occurs, for example, when the error correcting capability of the BCH or the LDPC code is exceeded. As compared to HDDs, exceeding the capability of the error-correcting code is more likely in flash devices, both as a page nears the end of its write endurance lifetime, or as a page nears the end of its data retention lifetime. Thus, the number of HEs in flash devices may be expected to grow over time, leaving latent HEs on a device. An array made up of flash devices may encounter a mix of catastrophic device failures combined with possibly more prevalent HEs.

Addition of first responder parities to data that is stored in a storage array reduces the number of storage devices that need to be accessed in order to recover from a single sector erasure in a stripe, as opposed to requiring access to all of the storage devices in the stripe, as is done in a RAID 5 architecture. Reducing the number of devices that are accessed in the event of a failure may increase the performance of the storage array. Further, global parities that are used in conjunction with row and column parities may also increase the minimum distance of the erasure correcting codes to 6, or to 7 or 8 in further embodiments. The minimum distance of the code is a parameter that measures the correcting-capability of the code. If the minimum distance of an erasure correcting code is d, the code can recover up to d−1 erasures, no matter where those erasures are located (for example, multiple erasures in the same row or column) in the storage array.

The data in the storage array is stored as stripes, in two-dimensional (2-D) storage arrays each stripe comprises an M by N array of symbols, i.e., M rows and N columns. The columns may each correspond to respective individual storage devices of the storage array, which may be flash solid state devices (SSDs). Flash SSDs provide relatively fast memory; however, over time, SSD memory may degrade as many reads and writes are performed, leading to errors in which one or more symbols in a stripe are lost. Each symbol may be a fixed-size sector, or page, comprising a fixed number of bytes of data. At least one of the columns (or devices) in a stripe is a row parity column, comprising a column of symbols that each give parity information for the specific row in the stripe in which the symbol is located. If a whole device fails, the data that was stored on the device is recovered by XORing the data stored in the surviving devices of the storage array. However, additional, isolated pages in other devices may also fail, resulting in data loss. Adding global parity symbols may prevent the data loss. However, all of the storage devices may need to be accessed in order to reconstruct the failed page. If page erasures are common, accessing all of the storage devices has a negative impact on overall system performance.

Figure 3:
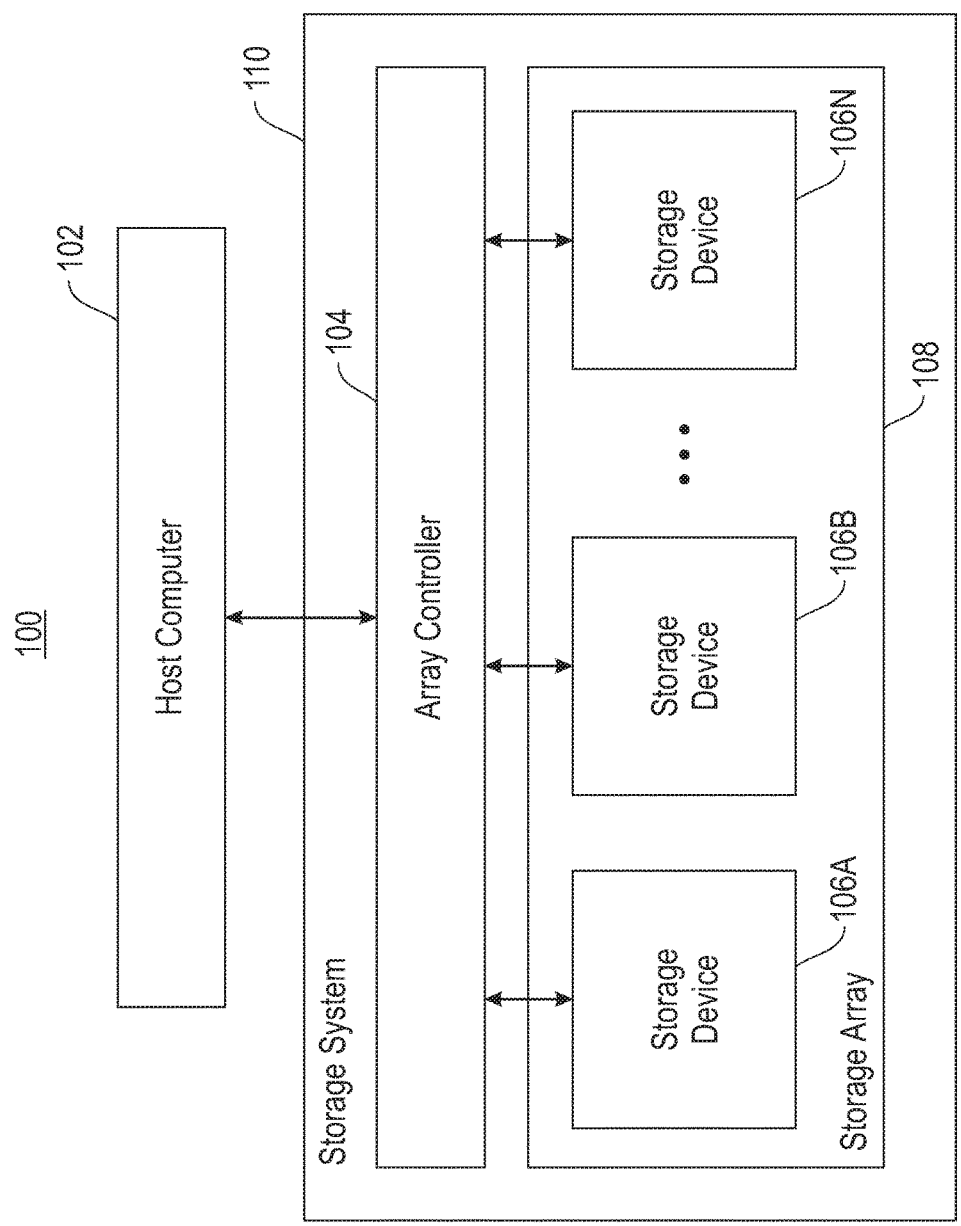
FIG. 3 illustrates a block diagram of a system for providing parities in a storage array, according to one embodiment.

FIG. 3 illustrates a block diagram of a system 100 for providing parities in multiple dimensions, according to one embodiment. As shown in FIG. 1, a host computer 102 is in communication with an array controller 104 in a storage system 110. The storage system 110 stores data in a storage array 108 made up of N storage devices 106 (where N is greater than one): storage device zero 106A, storage device one 106B, through storage device N−1 106N. In one embodiment, parity bits are stored in the storage devices 106A-N along with host data (e.g., represented as data bits). In one embodiment, the storage devices 106A-N in the storage array 108 are implemented by flash devices. In some embodiments, the array 108 is made up of a plurality of flash devices. The system 100 may comprise a RAID 5 or a RAID 6 architecture in various embodiments. As shown in FIG. 3, the array controller 104 is part of the storage system 110; in another embodiment, the array controller 104 is part of the host computer 102.

Figure 4:
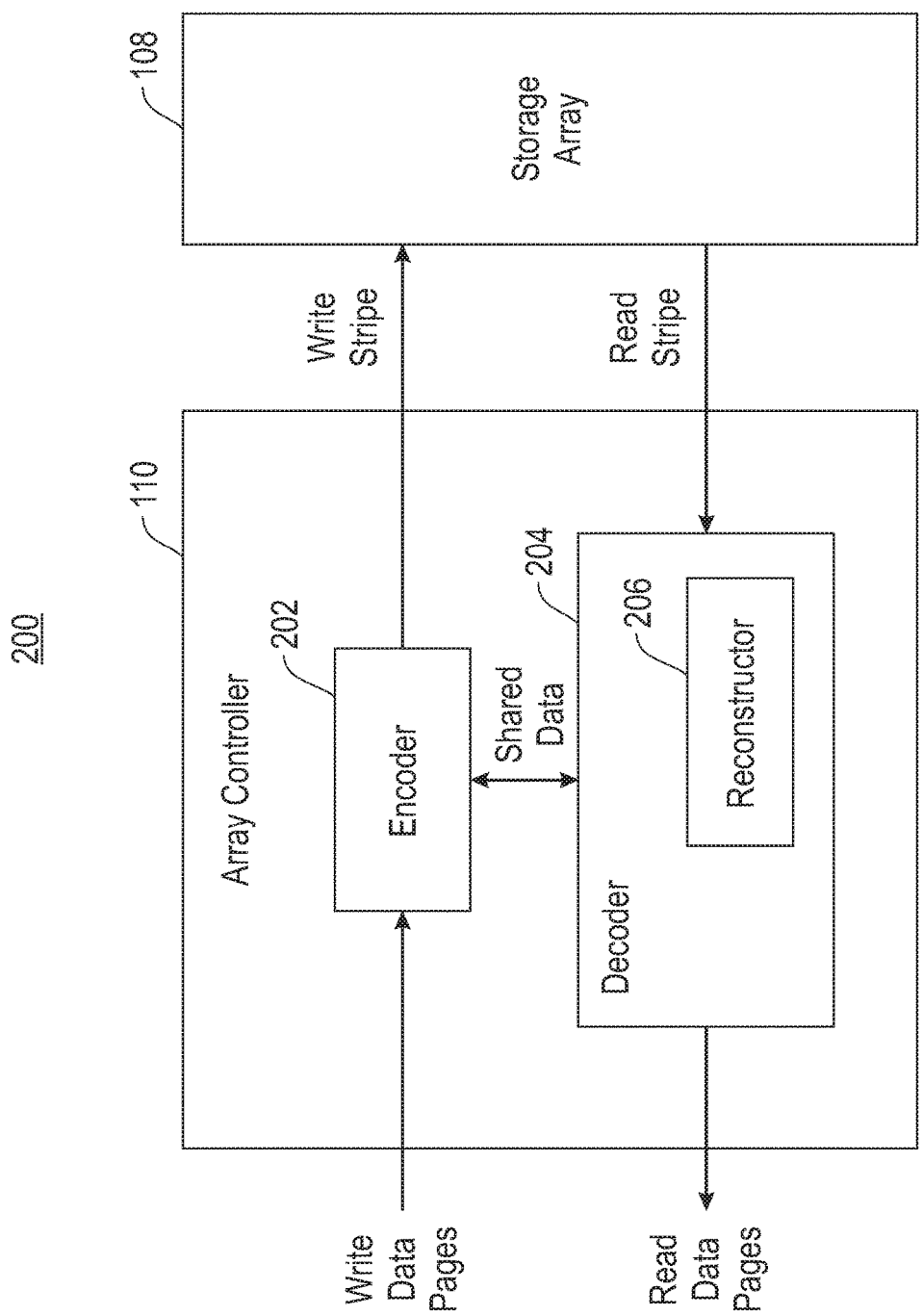
FIG. 4 illustrates a storage system, according to one embodiment.

FIG. 4 illustrates a system 200 including the storage system 110 of FIG. 3, according to one embodiment. The storage system 110 may include numerous other elements such as receivers, transmitters, and clocks as known by those of ordinary skill in the art, which are not illustrated for purposes of clarity. As shown in FIG. 4, the array controller 110 includes an encoder 202 and a decoder 204. The encoder 202 is utilized during a write process for receiving one or more write data pages (e.g., from the host computer 102) and generating a write stripe, which includes both data pages and parity pages. In one embodiment, the write stripe is written in the storage array 108 and spans a plurality of segments in the storage array 108. The decoder 204 is utilized during a read process for reading one or more data pages from the storage array 108. When one or more hard errors (HEs) in a page are detected, the decoder reads the whole stripe where the HEs have been detected from the storage array 108. The decoder 204 and the encoder 202 both have access to shared data (e.g., data to identify the type of encoding that was applied by the encoder 202 to the write pages to generate the write stripe). The read stripe contains parity bits that are removed by the decoder 204 to generate the read data pages. The decoder 204 includes a reconstructor 206 that is used when a read failure of at least one page has occurred. A read failure occurs, for example, when the error correcting capability of the internal ECC of a page has been exceeded. Typically, the locations of the pages in error are known and thus, the error locations (e.g., the erased page location(s))

and the read stripe are sent to the reconstructor 206, which attempts to retrieve the erased pages. The retrieval of the erased pages, including the process of correcting any errors in the erased pages (using, e.g., an erasure correcting code) is referred to herein as reconstructing the erased pages.

The decoder 204 may reconstruct erased pages as follows. The ECC and/or the cyclic redundancy check (CRC) in the decoder 204 detect that a page read has failed. The decoder 204 sends a request to read the pages in the stripe that are needed to reconstruct the erased page, including the parity data, from storage array 108. The decoder 204 then receives the read pages together with the location(s) of the page(s) where the read has failed (i.e., the erased page location(s)), and sends the read data and erasure information to the reconstructor 206. The reconstructor 206 then uses the non-erased data, including the parity data, to reconstruct the erased page(s).

In one or more embodiments, instead of 2-D m×n storage device arrays, parities in multiple dimensions are provided (although the example case of three dimensions (3-D) is described for ease of explanation). In one or more embodiments, parities in multiple dimensions (e.g., 3-D or higher dimensions) allow for recovery of a single failure by allowing multiple paths. Conventionally, the case of 2-D as mentioned above, involves cases with horizontal and vertical parities and extra global parities.

Consider a code of length $n_0 n_1 n_2$ whose coordinates are labeled by a 3-D array (that is referred herein as an $(n_0, n_1, n_2)$-cube) $(i, j, l)$, where $0 \leq i \leq n_0-1$, $0 \leq j \leq n_1-1$ and $0 \leq l \leq n_2-1$, an n is a positive integer. The elements of the code are denoted by $\alpha_{i,j,l}$, and when written in one dimension, the following correspondence is used for the one-dimensional ordering of the coordinates:

$$(i,j,l) \leftrightarrow i n_1 n_2 + j n_2 + l. \quad \text{(EQ. 8)}$$

In one or more embodiments, there are $n_0$ parallel planes of $n_1 n_2$ elements each, that is, for each $0 \leq i \leq n_0-1$, the planes consist of the $n_1 n_2$ entries $(i, j, l)$ such that $0 \leq j \leq n_1-1$ and $0 \leq l \leq n_2-1$. These $n_0$ planes are referred to as planes of class 0. Similarly, there are $n_1$ planes of class 1 (having $n_0 n_2$ elements each), and $n_2$ planes of class 2 (having $n_0 n_1$ elements each).

In one embodiment, a line is referred to as the intersection of two planes. For example, given $i$ and $j$, where $0 \leq i \leq n_0-1$ and $0 \leq j \leq n_1-1$, the $n_2$ coordinates $(i, j, l)$, where $0 \leq l \leq n_2-1$, constitute a line of length $n_2$. In one embodiment, the encoder 202 constructs three nested (i.e., contained within each other) codes $C_{n_0,n_1,n_2}^{(2)} \subset C_{n_0,n_1,n_2}^{(1)} \subset C_{n_0,n_1,n_2}^{(0)}$ of length $n_0 n_1 n_2$. $C_{n_0,n_1,n_2}^{(0)}$ is a code with even parity over each of the $n_0+n_1+n_2$ planes of class 0, 1 and 2, while $C_{n_0,n_1,n_2}^{(1)}$ and $C_{n_0,n_1,n_2}^{(2)}$ have one and two extra (global) parities respectively.

Consider a finite field $GF(2^b)$. Denote by $I_j$ the j×j identity matrix, by $\underline{e}_j$ the all-1 vector of length j and by $\otimes$ the tensor product of two matrices. The parity-check matrix of code $C_{n_0,n_1,n_2}^{(0)}$ is given by the $(n_0+n_1+n_2) \times n_0 n_1 n_2$ matrix $$H_{n_0,n_1,n_2}^{(0)} = \begin{pmatrix} I_{n_0} \otimes \underline{e}_{n_1 n_2} \\ \underline{e}_{n_0} \otimes (I_{n_2} \otimes \underline{e}_{n_1}) \\ \underline{e}_{n_0} \otimes (\underline{e}_{n_2} \otimes I_{n_1}) \end{pmatrix}. \quad \text{(EQ. 9)}$$

It can easily be seen that there are two linearly dependent rows in $H_{n_0,n_1,n_2}^{(0)}$ as given by (EQ. 9): the last row in $\underline{e}_{n_0} \otimes (I_{n_2} \otimes \underline{e}_{n_1})$ and the last row in $\underline{e}_{n_0} \otimes (\underline{e}_{n_2} \otimes I_{n_1})$ can be eliminated, since XORing all the rows of $$\begin{pmatrix} I_{n_0} \otimes \underline{e}_{n_1 n_2} \\ \underline{e}_{n_0} \otimes (I_{n_2} \otimes \underline{e}_{n_1}) \end{pmatrix}$$

and of $$\begin{pmatrix} I_{n_0} \otimes \underline{e}_{n_1 n_2} \\ \underline{e}_{n_0} \otimes (\underline{e}_{n_2} \otimes I_{n_1}) \end{pmatrix}$$

gives the zero vector. The remaining $n_0+n_1+n_2-2$ rows of $H_{n_0,n_1,n_2}^{(0)}$ are linearly independent, so $C_{n_0,n_1,n_2}^{(0)}$ has dimension $n_0 n_1 n_2 - n_0 - n_1 - n_2 + 2$. Thus, $C_{n_0,n_1,n_2}^{(0)}$ is an $[n_0 n_1 n_2, n_0 n_1 n_2 - n_0 - n_1 - n_2 + 2]$ code.

$C_{n_0,n_1,n_2}^{(1)}$ is defined as the $[n_0 n_1 n_2, n_0 n_1 n_2 - n_0 - n_1 - n_2 + 1]$ code whose parity-check matrix is given by $$H_{n_0,n_1,n_2}^{(1)} = \begin{pmatrix} H_{n_0,n_1,n_2}^{(0)} \\ 1 \; \alpha \; \alpha^2 \; \ldots \; \alpha^{n_0 n_1 n_2 - 1} \end{pmatrix}, \quad \text{(EQ. 10)}$$

and $C_{n_0,n_1,n_2}^{(2)}$ as the $[n_0 n_1 n_2, n_0 n_1 n_2 - n_0 - n_1 - n_2]$ code whose parity-check matrix is given by $$H_{n_0,n_1,n_2}^{(2)} = \begin{pmatrix} H_{n_0,n_1,n_2}^{(0)} \\ 1 \; \alpha \; \alpha^2 \; \ldots \; \alpha^{n_0 n_1 n_2 - 1} \\ 1 \; \alpha^{-1} \; \alpha^{-2} \; \ldots \; \alpha^{-n_0 n_1 n_2 + 1} \end{pmatrix}, \quad \text{(EQ. 11)}$$

where $H_{n_0,n_1,n_2}^{(0)}$ is given by (EQ 9).

The constructions are illustrated with an example where FIGS. 5-10 assist in understanding one or more embodiments. Consider codes $C_{2,3,3}^{(0)}$, $C_{2,3,3}^{(1)}$ and $C_{2,3,3}^{(2)}$. In one embodiment, the coordinates correspond to a 2×3×3 cube (see, e.g., FIGS. 5-6). The cube consists of 2 planes of class 0 containing 9 elements each, 3 planes of class 1 containing 6 elements each, and 3 planes of class 2 also containing 6 elements each, where each plane corresponds to a local parity (two of these local parities are dependent, so there are 6 independent local parities). In addition, one or two global parities are added illustrating the three codes in one or more embodiments.

Consider the finite field GF(32) and let α be a primitive element in GF(32) in one example embodiment. According to (EQ. 9), (EQ. 10) and (EQ. 11), the parity-check matrices of $C_{2,3,3}^{(0)}$, $C_{2,3,3}^{(1)}$ and $C_{2,3,3}^{(2)}$ are given by $$H_{2,3,3}^{(0)} =$$

$$\begin{pmatrix} 1 & 1 & 1 & 1 & 1 & 1 & 1 & 1 & 1 & 0 & 0 & 0 & 0 & 0 & 0 & 0 & 0 & 0 \\ 0 & 0 & 0 & 0 & 0 & 0 & 0 & 0 & 0 & 1 & 1 & 1 & 1 & 1 & 1 & 1 & 1 & 1 \\ 1 & 1 & 1 & 0 & 0 & 0 & 0 & 0 & 0 & 1 & 1 & 1 & 0 & 0 & 0 & 0 & 0 & 0 \\ 0 & 0 & 0 & 1 & 1 & 1 & 0 & 0 & 0 & 0 & 0 & 0 & 1 & 1 & 1 & 0 & 0 & 0 \\ 0 & 0 & 0 & 0 & 0 & 0 & 1 & 1 & 1 & 0 & 0 & 0 & 0 & 0 & 0 & 1 & 1 & 1 \\ 1 & 0 & 0 & 1 & 0 & 0 & 1 & 0 & 0 & 1 & 0 & 0 & 1 & 0 & 0 & 1 & 0 & 0 \\ 0 & 1 & 0 & 0 & 1 & 0 & 0 & 1 & 0 & 0 & 1 & 0 & 0 & 1 & 0 & 0 & 1 & 0 \\ 0 & 0 & 1 & 0 & 0 & 1 & 0 & 0 & 1 & 0 & 0 & 1 & 0 & 0 & 1 & 0 & 0 & 1 \end{pmatrix}$$

$$H_{2,3,3}^{(1)} = \begin{pmatrix} H_{2,3,3}^{(0)} \\ 1 \ \alpha \ \alpha^2 \ \ldots \ \alpha^{17} \end{pmatrix}$$

$$H_{2,3,3}^{(2)} = \begin{pmatrix} H_{2,3,3}^{(0)} \\ 1 \ \alpha \ \alpha^2 \ \ldots \ \alpha^{17} \\ 1 \ \alpha^{30} \ \alpha^{29} \ \ldots \ \alpha^{14} \end{pmatrix}$$

respectively. The fifth and eighth rows from each of these matrices may be eliminated since they are linearly dependent.

In one embodiment, first the erasure-correcting properties of $C_{n_0,n_1,n_2}^{(0)}$ is provided in the following. Code $C_{n_0,n_1,n_2}^{(0)}$ can correct any erased line and has minimum distance 4. Without loss of generality, consider the line given by $i_0$ and $j_0$, where $0 \le i_0 \le n_0-1$ and $0 \le j_0 \le n_1-1$, and assume that the elements on that line have been erased. There are $n_2$ parallel planes through each point $(i_0, j_0, l)$, $0 \le l \le n_2-1$ in the line. Since there is even parity on each of the planes, and, except for the erased element on the line, no other element has been erased, the erased element may be retrieved by XORing the non-erased elements in the plane.

In one embodiment, it can be seen that any three erased elements may be corrected. If the three elements are in the same line, then they are recovered as provided above. If one of the elements is not in a line with the other two, there is certainly a plane through it that does not contain any of the other two elements. This non-aligned erasure can be corrected using the parity on that plane. This leaves two erasures that are corrected similarly.

In one example embodiment, the code has codewords of weight 4. These correspond to codewords whose non-zero elements are in the vertices of rectangles in a plane. For example, consider coordinates (0,0,0), (0,0,1), (0,1,0) and (0,1,1) shown in FIG. 6. According to the relationship given by (EQ. 8), these coordinates, when taken in one dimension, correspond to 0, 1, $n_2$ and $n_2+1$ respectively. Assume that a vector is 1 in these four coordinates and 0 elsewhere. In one embodiment, it can be verified that the syndrome of such a vector with respect to parity-check matrix $H_{n_0,n_1,n_2}^{(0)}$ as given by (EQ. 9) is zero, which is a codeword of weight 4.

Next the special case $n_0=n_1=n_2=n$ is considered. Codes $C_{n,n,n}^{(i)}$ are denoted as $C_n^{(i)}$, where $0 \le i \le 2$. Similarly, denoted by $H_n^{(i)}$ are the parity check matrices corresponding to codes $C_n^{(i)}$. In one embodiment, minimum distance properties may be proved for $C_n^{(1)}$ and $C_n^{(2)}$, provided a finite field of size large enough is used. In one example embodiment, consider code $C_n^{(1)}$ over the field $GF(2^b)$, and assume that $n^3 \le 2^b-1$. Then $C_n^{(1)}$ has minimum distance 6 and any five erasures can be corrected.

In one embodiment, consider code $C_n^{(2)}$ over the field $GF(2^b)$, where $$n(n-1) \le 2^b-1$$

Then $C_n^{(2)}$ has minimum distance $d \ge 7$ and any six erasures can be corrected.

Although the description involves cubes and single parity over the different planes composing the cubes, the construction of codes in one or more embodiments is extended to hypercubes of dimension $t>3$, where the single parity will occur now over the hypercubes of dimension $t-1$ composing the hypercube of dimension $t$.

Figure 5:
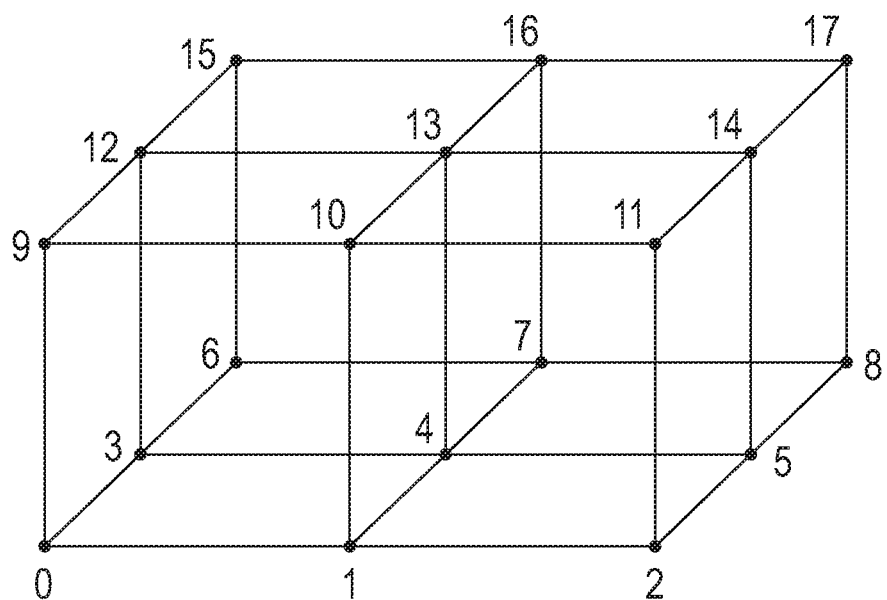
FIG. 5 is an example cube diagram illustrating points that correspond to coordinates, according to an embodiment.

FIG. 5 is an example cube 500 diagram illustrating points that correspond to coordinates, according to an embodiment. In the example cube 500, the 18 coordinates of the code correspond to points in the cube 500. In the example 500, these are numerated from 0 to 17. For the 3-D example described above, there are two parallel planes of type 0, each one containing 9 points: planes {0,1,2,3,4,5,6,7,8} and {9,10,11,12,13,14,15,16,17}, which is referred to as planes of type 0. There are three parallel planes of type 1, each one containing 6 points: {0,3,6,9,12,15}, {1,4,7,10,13,16} and {2,5,8,11,14,17}. There are also three parallel planes of type 2, each one containing 6 points: {0,1,2,9,10,11}, {3,4,5,11,13,14} and {6,7,8,15,16,17}.

In one example embodiment, it can be seen that the intersection of two non-parallel planes provides a line. For example, the intersection of plane {0,1,2,3,4,5,6,7,8} with plane {1,4,7,10,13,16} provides line {1,4,7}. In one embodiment, each point is, for example, a storage device (SD). Each plane corresponds to even parity. In one example embodiment, if SD 7 fails, it can be recovered using plane {0,1,2,3,4,5,6,7,8}: the XOR of SDs {0,1,2,3,4,5,6,8} provides the contents of the failed SD 7. Alternatively, in one embodiment it can be recovered using plane {1,4,7,10,13,16} or plane {6,7,8,15,16,17}. Therefore, in one embodiment there are three alternative ways to recover the failed SD.

In one embodiment, a whole line may be recovered, such as the aforementioned {1,4,7} line: in this case, SD 1 is recovered using plane {0,1,2,9,10,11} (notice that the only failed SD is SD 1 in this plane), SD 4 using plane {3,4,5, 12,13,14} and SD 7 using plane {6,7,8,15,16,17}. In one embodiment, if the parities on planes are only used, this is what is referred to as code $C^{(0)}_{2,3,3}$. But this code has limitations. In one example, rectangles, such as {0,1,6,7} cannot be recovered. To this end, in one embodiment a global parity is required, such as the global parity provided by code $C^{(1)}_{2,3,3}$, which allows to correct rectangles or any five failed SDs for that matter.

Figure 6:
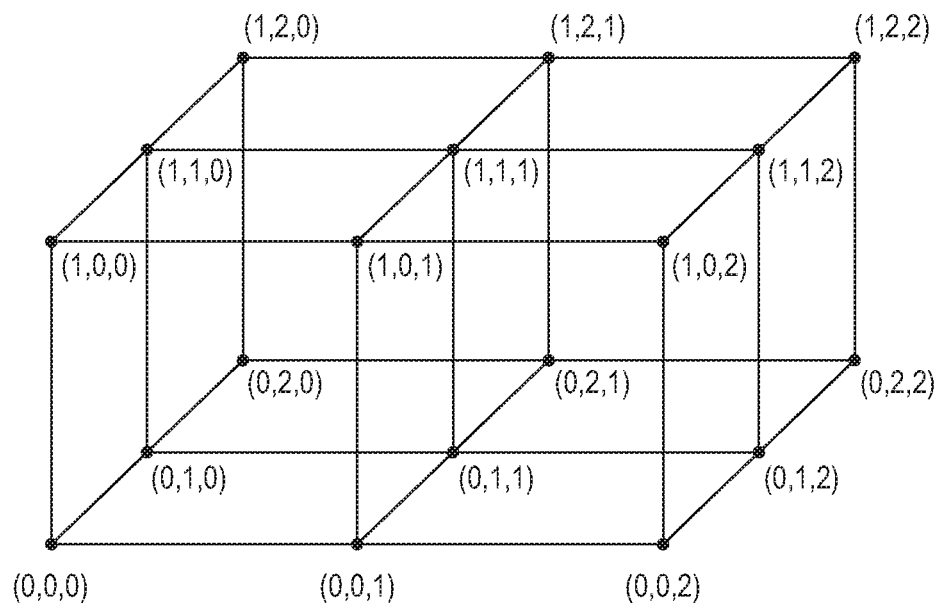
FIG. 6 is another example cube diagram illustrating three-dimensional (3-D) coordinates used for coding, according to an embodiment.

FIG. 6 is another example cube 600 diagram illustrating 3-D coordinates used for coding, according to an embodiment. Cube 600 is similar to cube 500. Cube 500 (FIG. 5) and 600, together, assist in illustrating the assignment of EQ. 8 described above.

Figure 7:
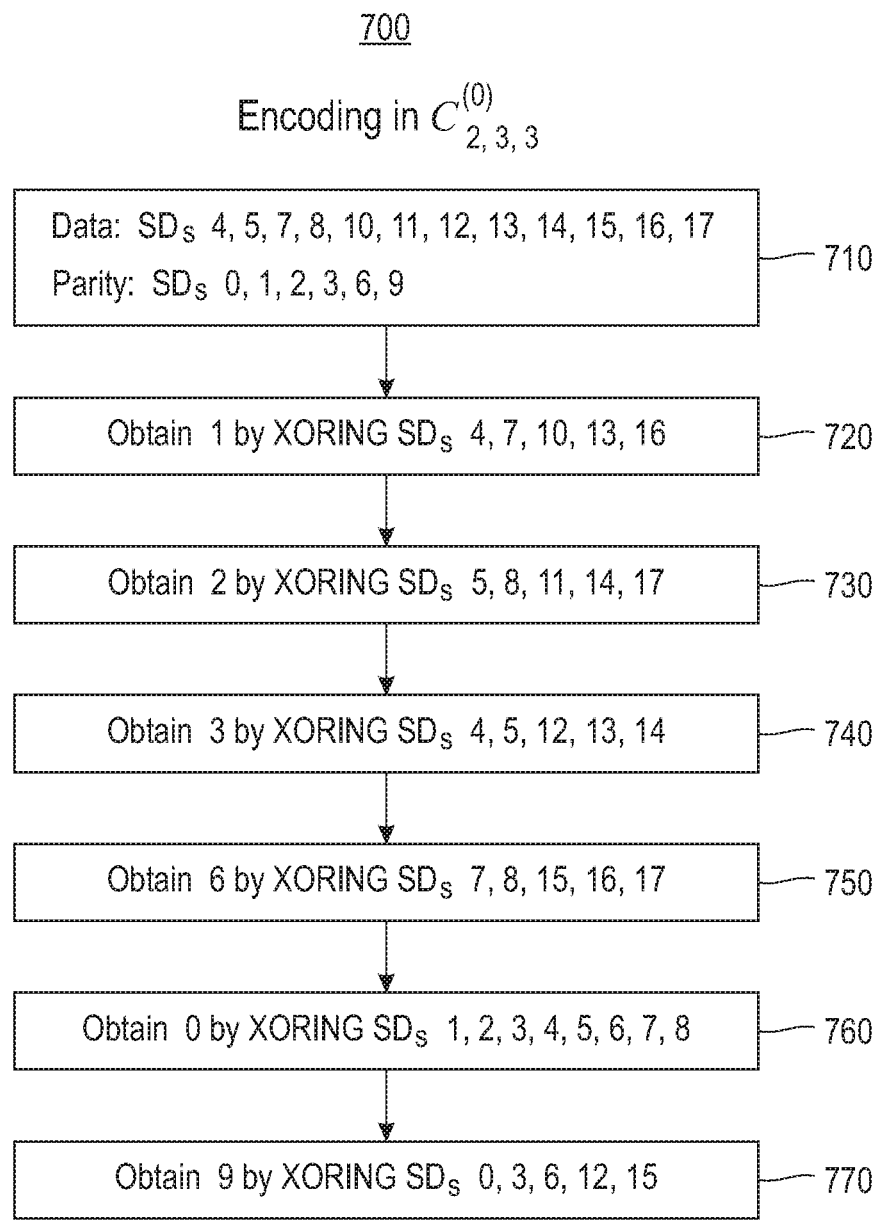
FIG. 7 is a block diagram for an encoding process for separating nodes (SDs) into data SDs and parity SDs, according to an embodiment.

FIG. 7 is a block diagram for an encoding process 700 for separating nodes (e.g., SDs) into data SDs and parity SDs, according to an embodiment. Process 700 shows explicitly how to obtain the parity nodes from the data nodes. The process 700 is provided to assist with the example embodiment described above for a 3-D storage array. It should be noted that the general case proceeds similarly. The decoding of code $C^{(0)}_{2,3,3}$ whose encoding process is given by 700 is provided in FIG. 8. In one example embodiment, process 700 begins with block 710 where the division of the SDs occur. As shown, the SDs are separated into data SDs and Parity SDs.

In one embodiment, in block 720, SD 1 is obtained by performing XORing on SDs 4, 7, 10, 13 and 16. In one embodiment, in block 730, SD 2 is obtained by performing XORing on SDs 5, 8, 11, 14 and 17. In one embodiment, in block 740, SD 3 is obtained by performing XORing on SDs 4, 5, 12, 13 and 14. In one embodiment, in block 750, SD 6 is obtained by performing XORing on SDs 7, 8, 15, 16 and 17. In one embodiment, in block 760, SD 0 is obtained by performing XORing on SDs 1, 2, 3, 4, 5, 6, 7 and 8. In one embodiment, in block 770, SD 9 is obtained by performing XORing on SDs 0, 3, 6, 12 and 15.

Figure 8:
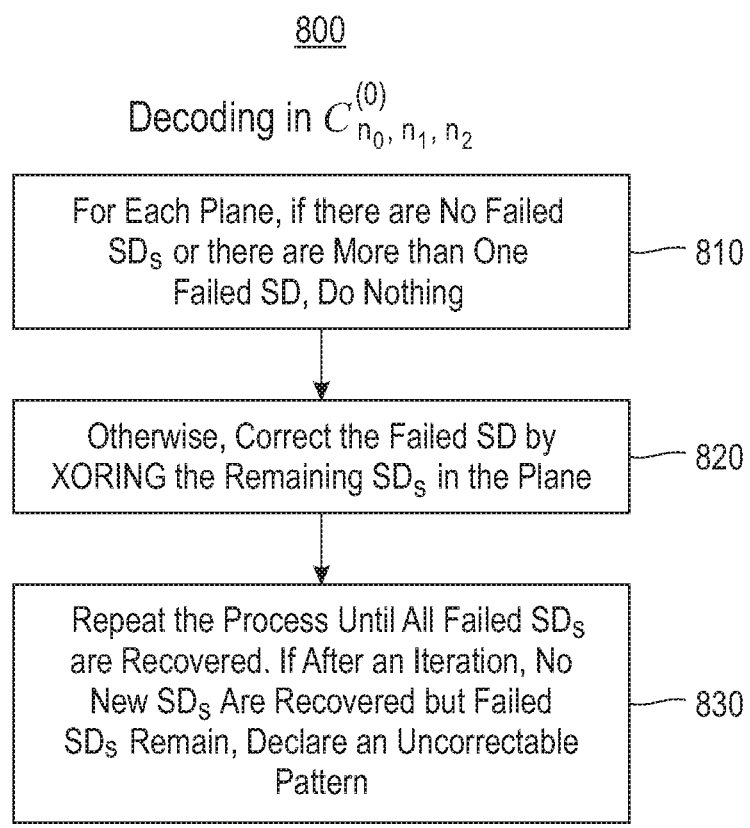
FIG. 8 is a block diagram for a decoding process for the encoding process of FIG. 7, according to an embodiment.

FIG. 8 is a block diagram for a decoding process 800 for the encoding process of FIG. 7, according to an embodiment. In one embodiment, in process 800 particular parameters are not taken, instead the process 800 proceeds in general. In one embodiment, it should be noted that the encoding (e.g., process 700, FIG. 7) is a special case of the decoding process 800, which is always true for error-correcting codes (the parity SDs may be considered as failed SDs and are recovered from the surviving ones). In one embodiment, the decoding process 800 consists of iterations over all possible planes until all the failed SDs are corrected, or there is an iteration providing no new corrections and failed SDs remain. In that case it may be declared that there exists an uncorrectable error.

In one embodiment, in block 810 for each plane, if there are no failed SDs or there are more than one failed SD, the process 800 does nothing and proceeds to block 820. In block 820, process 800 corrects the failed SD by XORing the remaining SDs in the plane. In one embodiment, in block 830 the process 800 is repeated until all failed SDs are recovered. If after an iteration there are no new SDs that are recovered, but failed SDs remain, an uncorrectable pattern is declared.

Figure 9:
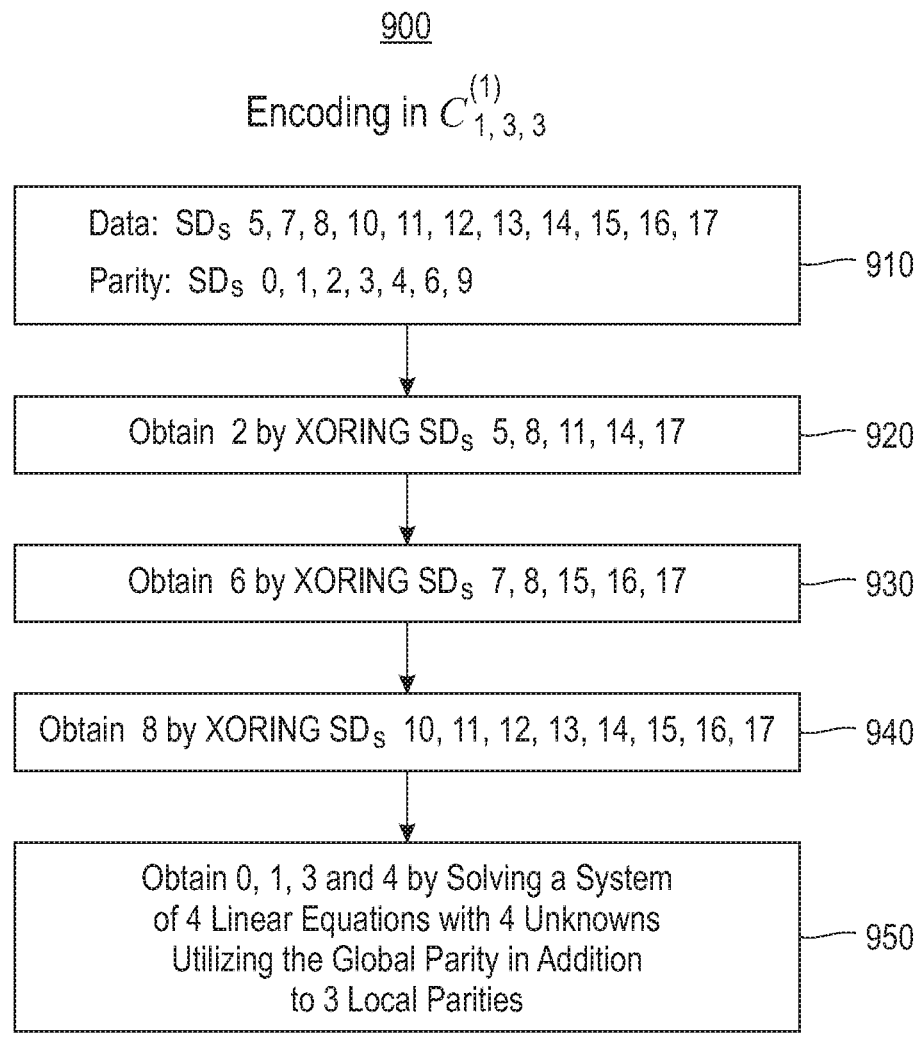
FIG. 9 is a block diagram for an example encoding process with additional global parity, according to an embodiment.

FIG. 9 is a block diagram for an example encoding process 900 with additional global parity, according to an embodiment. The encoding process 900 assists with the example described above for the 3-D storage device array. In one example embodiment, process 900 is similar to process 700 (FIG. 7) but with an extra (global) parity. While the processes 700 and 900 are similar, at the end, process 900 requires solving 4 parity SDs simultaneously, which can be done by using the global parity.

In one embodiment, in block 910 the SDs are divided into data SDs and parity SDs. In block 920, SD2 is obtained by XORing SDs 5, 8, 11, 14 and 17. In block 930, SD6 is obtained by XORing SDs 7, 8, 15, 16 and 17. In block 940, SD9 is obtained by XORing SDs 10, 11, 12, 13, 14, 15, 16 and 17. In one embodiment, in block 950 SDs 0, 1, 3 and 4 are obtained by solving a system of four linear equations with four unknowns utilizing the global parity in addition to three local parities.

Figure 10:
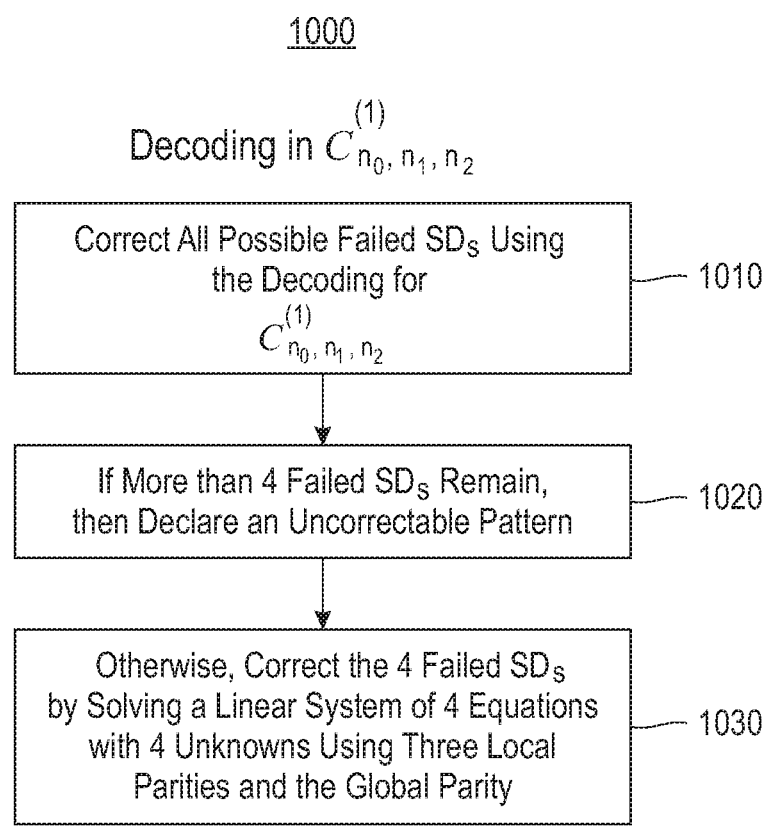
FIG. 10 is a block diagram for an example decoding process for the encoding of FIG. 9, according to an embodiment.

FIG. 10 is a block diagram for an example decoding process 1000 for the encoding of FIG. 9, according to an embodiment. In one embodiment, process 1000 illustrates the decoding of process 900 (FIG. 9) in general. In one embodiment, at the end of process 1000, if decoding fails, it attempts to correct the remaining failed SDs provided that there are no more than four failed SDs.

In one embodiment, in block 1010 all possible failed SDs are corrected using the decoding for $C_{n_0,n_1,n_2}^{(0)}$. In block 1020, if more than four failed SDs remain, an uncorrectable pattern is declared. In one embodiment, in block 1030, the four failed SDs are corrected by solving a linear system of four equations with four unknowns using the local parities and the global parity.

Figure 11:
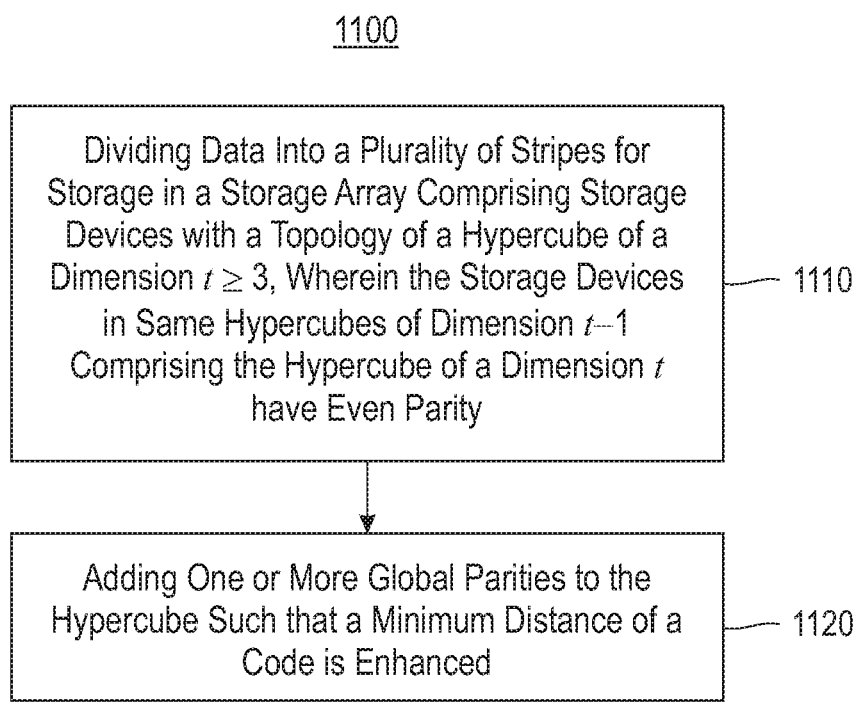
FIG. 11 is a block diagram for a process for additional parities in multiple dimensions for data recovery, according to an embodiment.

FIG. 11 illustrates a block diagram for a process 1100 for distributed coding, according to one embodiment. In one embodiment, in block 1110, process 1000 includes dividing data into multiple stripes for storage in a storage array comprising storage devices with a topology of a hypercube of a dimension t≥3. The storage devices in the same hypercubes of dimension t−1 comprising the hypercube of a dimension t have even parity.

In one embodiment, in process 1100 the storage devices are linked by one or more global parities over a finite field. In one embodiment, in process 1100 the storage devices are linked by one global parity, and the minimum distance of a code is 6. In one embodiment, the storage devices are linked by two global parities, and the minimum distance of a code is at least 7.

In one embodiment, in process 1100 a line is an intersection of any two planes of the multiple planes. In one embodiment, process 1100 may further include retrieving any erased elements of a line by XORing non-erased elements in a plane. In one embodiment, process 1100 may further include correcting a number of erasures using the one or more global parities. IN one embodiment, in block 1120 one or more global parities are added to the hypercube such that a minimum distance of a code is enhanced.

Figure 12:
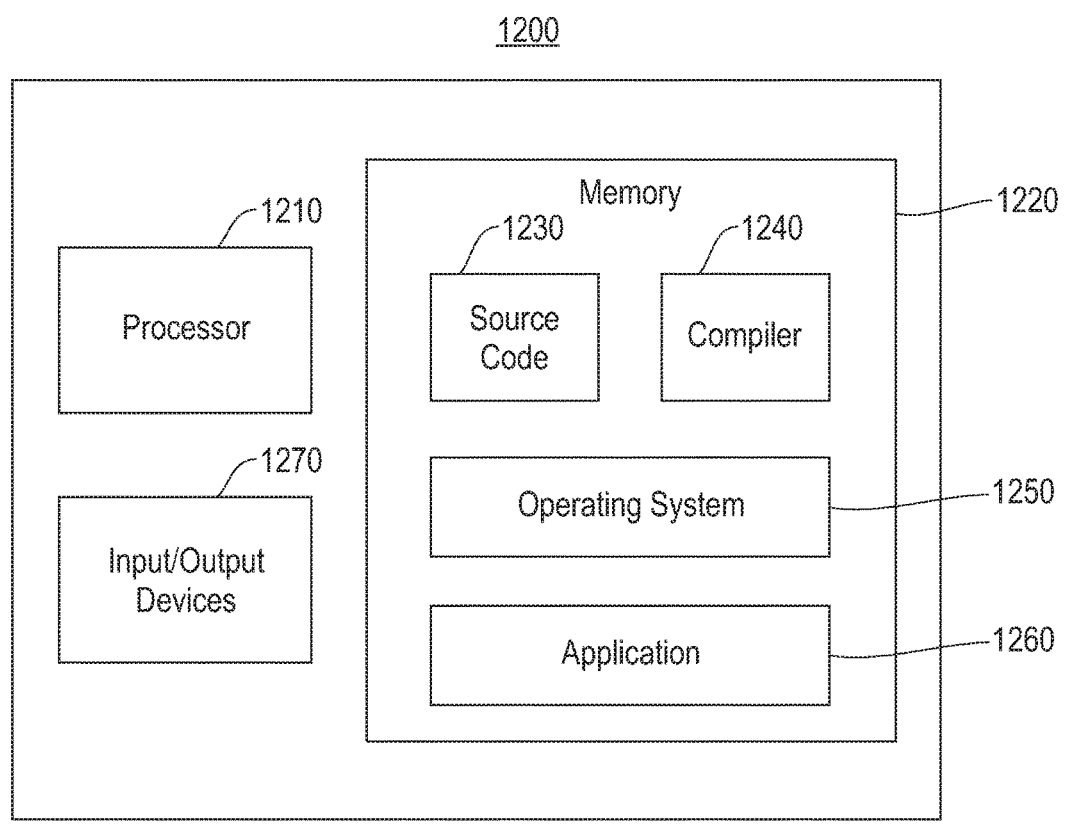
FIG. 12 illustrates an embodiment of a computer system that may be used in conjunction with embodiments with additional parities in multiple dimensions for data recovery, according to one embodiment.

FIG. 12 illustrates an example of a computer 1200 which may be utilized by exemplary embodiments of first responder parity for a storage array. Various operations discussed above may utilize the capabilities of the computer 1200. One or more of the capabilities of the computer 1200 may be incorporated in any element, module, application, and/or component discussed herein.

The computer 1200 includes, but is not limited to, PCs, workstations, laptops, PDAs, palm devices, servers, storages, and the like. Generally, in terms of hardware architecture, the computer 1200 may include one or more processors 1210, memory 1220, and one or more I/O devices 1270 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1210 is a hardware device for executing software that can be stored in the memory 1220. The processor 1210 can be virtually any custom made or commercially available processor, a central processing unit (CPU), a digital signal processor (DSP), or an auxiliary processor among several processors associated with the computer 1200, and the processor 1210 may be a semiconductor based microprocessor (in the form of a microchip) or a macroprocessor.

The memory 1220 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1220 may incorporate electronic, magnetic, optical, and/or other types of storage media. Note that the memory 1220 can have a distributed architecture, where various components are situated remote from one another, but can be accessed by the processor 1210.

The software in the memory 1220 may include one or more separate programs, each of which comprises an ordered listing of executable instructions for implementing logical functions. The software in the memory 1220 includes a suitable operating system (O/S) 1250, compiler 1240, source code 1230, and one or more applications 1260 in accordance with exemplary embodiments. As illustrated, the application 1260 comprises numerous functional components for implementing the features and operations of the exemplary embodiments. The application 1260 of the computer 1200 may represent various applications, computational units, logic, functional units, processes, operations, virtual entities, and/or modules in accordance with exemplary embodiments, but the application 1260 is not meant to be a limitation.

The operating system 1250 controls the execution of other computer programs, and provides scheduling, input-output control, file and data management, memory management, and communication control and related services. It is contemplated by the inventors that the application 1260 for implementing exemplary embodiments may be applicable on all commercially available operating systems.

Application 1260 may be a source program, executable program (object code), script, or any other entity comprising a set of instructions to be performed. When a source program, then the program is usually translated via a compiler (such as the compiler 1240), assembler, interpreter, or the like, which may or may not be included within the memory 1220, so as to operate properly in connection with the O/S 1250. Furthermore, the application 1260 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 1270 may include input devices such as, for example but not limited to, a mouse, keyboard, scanner, microphone, camera, etc. Furthermore, the I/O devices 1270 may also include output devices, for example but not limited to a printer, display, etc. Finally, the I/O devices 1270 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1270 also include components for communicating over various networks, such as the Internet or intranet.

If the computer 1200 is a PC, workstation, intelligent device or the like, the software in the memory 1220 may further include a basic input output system (BIOS) (omitted for simplicity). The BIOS is a set of essential software routines that initialize and test hardware at startup, start the O/S 1250, and support the transfer of data among the hardware devices. The BIOS is stored in some type of read-only-memory, such as ROM, PROM, EPROM, EEPROM or the like, so that the BIOS can be executed when the computer 1200 is activated.

When the computer 1200 is in operation, the processor 1210 is configured to execute software stored within the memory 1220, to communicate data to and from the memory 1220, and to generally control operations of the computer 1200 pursuant to the software. The application 1260 and the O/S 1250 are read, in whole or in part, by the processor 1210, perhaps buffered within the processor 1210, and then executed.

When the application 1260 is implemented in software it should be noted that the application 1260 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 1260 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 1260 is implemented in hardware, the application 1260 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In one or more embodiments, technical effects and benefits include correction of errors in a storage array by reading from a reduced number of storage devices of the storage array.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a nonexhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for memory page erasure reconstruction in a storage array comprising:
  dividing data into a plurality of stripes for storage in a storage array comprising a plurality of storage devices with a topology of a hypercube of a dimension $t \leq 3$, wherein the storage devices in same hypercubes of dimension t−1 comprising the hypercube of dimension t have even parity, an intersection of two non-parallel planes in the hypercube topology is a line, and each point along a line is a storage device in the storage array;

generating erasure-correcting properties for the data using three nested codes, wherein a first nested code has even parity over planes of class 0, 1 and 2, a second nested code has a first global parity, and a third nested code has a second global parity and a third global parity;

detecting a page read has failed due to erased memory pages in the storage array; and reconstructing, by a reconstructor processor, erased data for the erased memory pages from non-erased data in the storage array by using parities in at least three dimensions based on the hypercube topology of the storage devices limiting storage device accesses in the storage array for reconstruction to at least one plane within the hypercube topology including the non-erased memory pages, wherein a minimum distance d for the three nested codes provides reconstruction of d−1 erasures in the storage array.

2. The method of claim 1, wherein:

the at least one plane comprises at least one of: a first plane including the erased data, and any other plane that intersects with a particular storage device in the hypercube topology that included the erased data; and the storage devices are linked by one or more of the first global parity, the second global parity and the third global parity over a finite field.

3. The method of claim 1, wherein the storage devices are linked by one of the first global parity, the second global parity and the third global parity, and d is 6.

4. The method of claim 1, wherein the storage devices are linked by two of: the first global parity, the second global parity and the third global parity, and d is at least 7.

5. The method of claim 1, wherein:

t=3;

the hypercube topology comprises $n_0$ parallel planes of $n_1 n_2$ elements each, such that each $0 \le i \le n_0 - 1$;

planes in the hypercube topology comprise the $n_1 n_2$ elements entries (i, j, l) such that $0 \le j \cdot n_1 - 1$ and $0 \le l \le n_2 - 1$, where $n_0$ planes are class 0, $n_1$ planes are class 1 including $n_0 n_2$ elements each, and $n_2$ planes are class 2 including $n_0 n_1$ elements each; and the three nested codes are represented as: $C_{n_0,n_1,n_2}^{(2)} \subset C_{n_0,n_1,n_2}^{(1)} \subset C_{n_0,n_1,n_2}^{(0)}$ of length $n_0 n_1 n_2$.

6. The method of claim 1, further comprising retrieving any erased elements of a line by XORing non-erased elements in a plane.

7. The method of claim 1, further comprising correcting a number of erasures using one or more of the first global parity, the second global parity and the third global parity.

8. A computer program product for memory page erasure reconstruction in a storage array, the computer program product comprising a computer readable storage medium having program instructions embodied therewith, the program instructions executable by a processor to cause the processor to:

divide, by the processor, data into a plurality of stripes for storage in a storage array comprising a plurality of storage devices with a topology of a hypercube of a dimension $t \le 3$, wherein the storage devices in same hypercubes of dimension t−1 comprising the hypercube of dimension t have even parity, an intersection of two non-parallel planes in the hypercube topology is a line, and each point along a line is a storage device in the storage array;

generate, by the processor, erasure-correcting properties for the data using three nested codes, wherein a first nested code has even parity over planes of class 0, 1 and 2, a second nested code has a first global parity, and a third nested code has a second global parity and a third global parity;

detect, by the processor, a page read has failed due to erased memory pages in the storage array; and reconstruct, by the processor, erased data for the erased memory pages from non-erased data in the storage array by using parities in at least three dimensions based on the hypercube topology of the storage devices limiting storage device accesses in the storage array for reconstruction to at least one plane within the hypercube topology including non-erased memory pages, wherein a minimum distance d for the three nested codes provides reconstruction of d−1 erasures in the storage array.

9. The computer program product of claim 8, wherein the storage devices are linked by one or more of the first global parity, the second global parity and the third global parity over a finite field, and the at least one plane comprises at least one of: a first plane including the erased data, and any plane that intersects with a particular storage device in the hypercube topology that included the erased data.

10. The computer program product of claim 8, wherein the storage devices are linked by one of the first global parity, the second global parity and the third global parity, and d is 6.

11. The computer program product of claim 8, wherein the storage devices are linked by two of: the first global parity, the second global parity and the third global parity, and d is at least 7.

12. The computer program product of claim 8, wherein:

t=3;

wherein:

the hypercube topology comprises $n_0$ parallel planes of $n_1 n_2$ elements each, such that each $0 \le i \le n_0 - 1$;

planes in the hypercube topology comprise the $n_1 n_2$ elements entries (i, j, l) such that $0 \le j \le n_1 - 1$ and $0 \le l \le n_2 - 1$, where $n_0$ planes are class 0, $n_1$ planes are class 1 including $n_0 n_2$ elements each, and $n_2$ planes are class 2 including $n_0 n_1$ elements each; and the three nested codes are represented as: $C_{n_0,n_1,n_2}^{(2)} \subset C_{n_0,n_1,n_2}^{(1)} \subset C_{n_0,n_1,n_2}^{(0)}$ of length $n_0 n_1 n_2$.

13. The computer program product of claim 8, further comprising program instructions executable by the processor to cause the processor to:

retrieve, by the processor, any erased elements of a line by XORing non-erased elements in a plane.

14. The computer program product of claim 8, further comprising program instructions executable by the processor to cause the processor to:

correct, by the processor, a number of erasures using one or more of the first global parity, the second global parity and the third global parity.

15. An array of storage devices comprising:

a storage device array comprising a plurality of storage devices with a topology of a hypercube of a dimension $t \le 3$, wherein the plurality of storage devices in same hypercubes of dimension t−1 comprising the hypercube of a dimension t have even parity, an intersection of two non-parallel planes in the hypercube topology is a line, and each point along a line is a storage device in the storage array; and a processor configured to:
divide data into a plurality of stripes for storage in the storage array,
generate erasure-correcting properties for the data using three nested codes, wherein a first nested code has even parity over planes of class 0, 1 and 2, a second nested code has a first global parity, and a third nested code has a second global parity and a third global parity,
detect a page read has failed due to erased memory pages in the storage array, and
reconstruct erased data for the erased memory pages from non-erased data in the storage array by using parities in at least three dimensions based on the hypercube topology of the storage devices limiting storage device accesses in the storage array for reconstruction to at least one plane within the hypercube topology including the non-erased memory pages, wherein a minimum distance d for the three nested codes provides reconstruction of d−1 erasures in the storage array.

16. The array of storage devices of claim 15, wherein:
the at least one plane comprises at least one of: a first plane including the erased data, and any other plane that intersects with a particular storage device in the hypercube topology that included the erased data; and
the plurality of storage devices are linked by one or more of the first global parity, the second global parity and the third global parity over a finite field.

17. The array of storage devices of claim 15, wherein the plurality of storage devices are linked by the at least one global parity, and d is 6.

18. The array of storage devices of claim 15, wherein the plurality of storage devices are linked by two of: the first global parity, the second global parity and the third global parity, and d is at least 7.

19. The array of storage devices of claim 15, wherein:
$t=3$;
the hypercube topology comprises $n_0$ parallel planes of $n_1 n_2$ elements each, such that each $0 \le i \le n_0 - 1$;
planes in the hypercube topology comprise the $n_1 n_2$ elements entries $(i, j, l)$ such that $0 \le j \le n_1 - 1$ and $0 \le l \le n_2 - 1$, where $n_0$ planes are class 0, $n_1$ planes are class 1 including $n_0 n_2$ elements each, and $n_2$ planes are class 2 including $n_0 n_1$ elements each; and
the three nested codes are represented as: $C_{n_0,n_1,n_2}^{(2)} \subset C_{n_0,n_1,n_2}^{(1)} \subset C_{n_0,n_1,n_2}^{(0)}$ of length $n_0 n_1 n_2$.

20. The array of storage devices of claim 15, wherein the processor is further configured to:
retrieve any erased elements of a line by XORing non-erased elements in a plane; and
correct a number of erasures using one or more of the first global parity, the second global parity and the third global parity.

* * * * *